US011958743B2

(12) United States Patent
Yu et al.

(10) Patent No.: US 11,958,743 B2
(45) Date of Patent: Apr. 16, 2024

(54) METHOD FOR PREPARING LITHIUM IRON PHOSPHATE BY RECYCLING WASTE BATTERIES

(71) Applicants: GUANGDONG BRUNP RECYCLING TECHNOLOGY CO., LTD., Guangdong (CN); HUNAN BRUNP RECYCLING TECHNOLOGY CO., LTD., Hunan (CN); HUNAN BRUNP VEHICLES RECYCLING CO., LTD., Hunan (CN)

(72) Inventors: Haijun Yu, Guangdong (CN); Yinghao Xie, Guangdong (CN); Aixia Li, Guangdong (CN); Xuemei Zhang, Guangdong (CN); Changdong Li, Guangdong (CN)

(73) Assignees: GUANGDONG BRUNP RECYCLING TECHNOLOGY CO., LTD., Guangdong (CN); HUNAN BRUNP RECYCLING TECHNOLOGY CO., LTD., Hunan (CN); HUNAN BRUNP VEHICLES RECYCLING CO., LTD., Hunan (CN)

(*) Notice: Subject to any disclaimer, the term of this patent is extended or adjusted under 35 U.S.C. 154(b) by 0 days.

(21) Appl. No.: 18/265,862

(22) PCT Filed: Dec. 30, 2021

(86) PCT No.: PCT/CN2021/142952
§ 371 (c)(1),
(2) Date: Jun. 7, 2023

(87) PCT Pub. No.: WO2022/267424
PCT Pub. Date: Dec. 29, 2022

(65) Prior Publication Data
US 2024/0034627 A1 Feb. 1, 2024

(30) Foreign Application Priority Data

Jun. 24, 2021 (CN) .......................... 202110706875.3

(51) Int. Cl.
C01B 25/45 (2006.01)
H01M 10/54 (2006.01)
(52) U.S. Cl.
CPC ............. *C01B 25/45* (2013.01); *H01M 10/54* (2013.01)
(58) Field of Classification Search
CPC .... H01M 4/5825; H01M 4/587; H01M 4/366; H01M 10/54
See application file for complete search history.

(56) References Cited

FOREIGN PATENT DOCUMENTS

CN 102148374 A 8/2011
CN 102751548 A 10/2012
(Continued)

OTHER PUBLICATIONS

English translation of CN Publication 112794300, May 2021.*
(Continued)

*Primary Examiner* — Brittany L Raymond
(74) *Attorney, Agent, or Firm* — MYERS WOLIN, LLC

(57) ABSTRACT

A method of preparing lithium iron phosphate by recycling and utilizing waste batteries. The method may include pre-processing a waste lithium iron phosphate battery to obtain lithium iron phosphate powder, adding alkaline liquid to the lithium iron phosphate powder, and filtering to obtain a filter residue; an iron source, a lithium source or a phosphorus source to the filter residue, and performing ball milling to obtain a ball-milled product; preparing a carbon source solution, and adding a surfactant to the carbon source solution to obtain a mixed solution; mixing the ball-milled product and the mixed solution, performing spray pyrolysis (Continued)

to obtain a high-temperature powder, spraying atomized water to the high-temperature powder to remove impurities, and then calcining to obtain a finished product of lithium iron phosphate.

8 Claims, 1 Drawing Sheet

(56) References Cited

FOREIGN PATENT DOCUMENTS

| | | | |
|---|---|---|---|
| CN | 109768344 A | | 5/2019 |
| CN | 110620278 A | | 12/2019 |
| CN | 112054261 | * | 12/2020 |
| CN | 112054261 A | | 12/2020 |
| CN | 112408353 | * | 2/2021 |
| CN | 112408353 A | | 2/2021 |
| CN | 112794300 | * | 5/2021 |
| CN | 112794300 A | | 5/2021 |
| CN | 113526482 A | | 10/2021 |
| CN | 113526482 B | | 5/2023 |
| JP | 2009-62256 A | | 3/2009 |
| KR | 10-1435657 B1 | | 8/2014 |

OTHER PUBLICATIONS

English translation of CN Publication 112408353, Feb. 2021.*
English translation of CN Publication 112054261, Dec. 2020.*
International Search Report and Written Opinion of the International Search Authority issued by the China National Intellectual Property Administration for International Patent Application No. PCT/CN2021/142952, dated Mar. 28, 2022, with an English translation.
First Office Action and Search Report issued by the State Intellectual Property Office of People's Republic of China for Chinese Patent Application No. 202110706875.3, dated May 20, 2022, with an English translation.
Second Office Action issued by the State Intellectual Property Office of People's Republic of China for Chinese Patent Application No. 202110706875.3, dated Nov. 3, 2022, with an English translation.
Notification to Grant Patent Right for Invention issued by the State Intellectual Property Office of People's Republic of China for Chinese Patent Application No. 202110706875.3, dated Feb. 27, 2023, with an English translation.

* cited by examiner

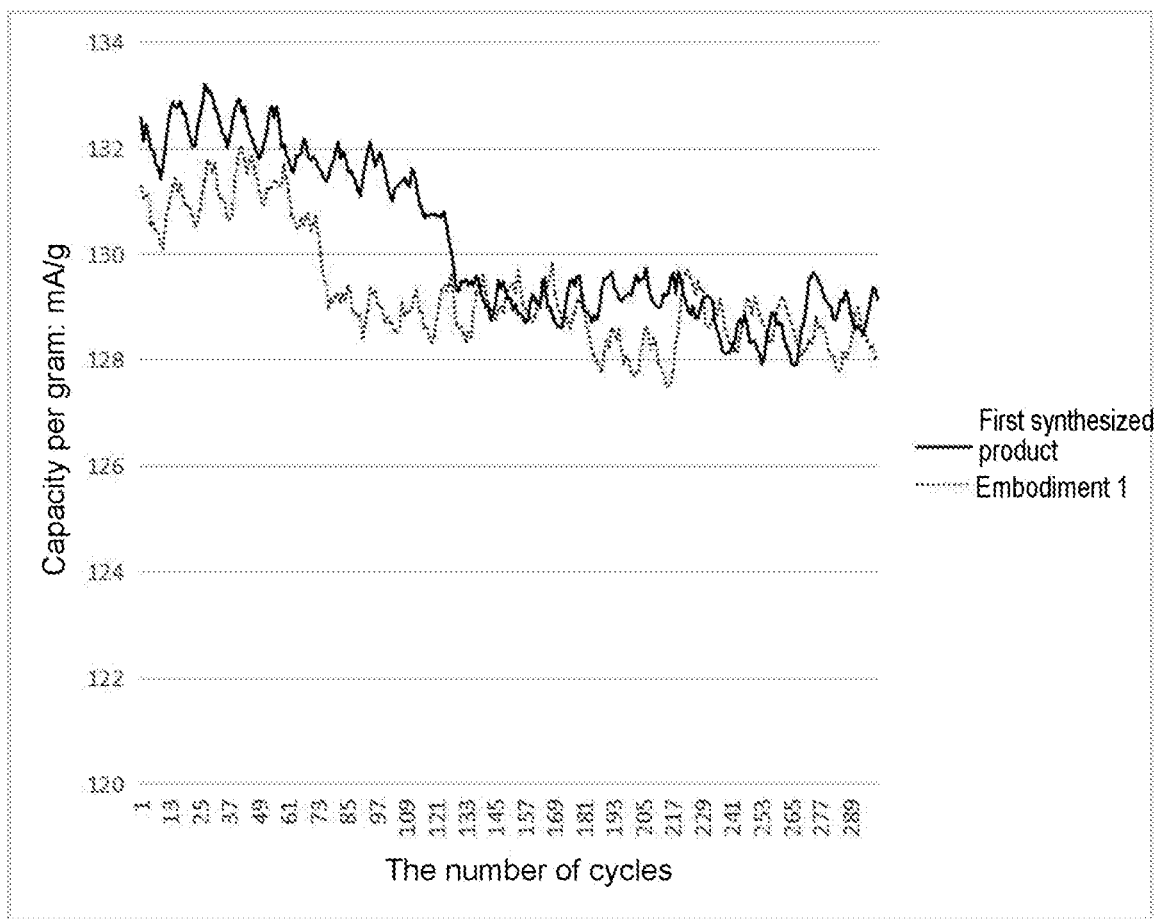

METHOD FOR PREPARING LITHIUM IRON PHOSPHATE BY RECYCLING WASTE BATTERIES

CROSS-REFERENCE TO RELATED APPLICATIONS

This application is a National Stage under 35 U.S.C. § 371 of International Application Number PCT/CN2021/142952, filed on Dec. 30, 2021, and which designated the U.S., which claims priority to Chinese patent application No. 202110706875.3, filed on Jun. 24, 2021. The contents of each are incorporated herein by reference in their entirety.

TECHNICAL FIELD

The present invention relates to the technical field of the new energy material of lithium-ion batteries, and more particularly, to a method of preparing lithium iron phosphate by recycling and utilizing waste batteries.

BACKGROUND

The lithium iron phosphate power battery has high safety, can be quickly charged and the number of cycles can reach 2000 times, has good safety performance, and has gradually become a new choice for the power battery of electric vehicles. With the increasing market share and scrap volume of lithium iron phosphate power batteries, the recycling utilization of lithium iron phosphate in the waste lithium iron phosphate power batteries also becomes one of the key contents of power battery recycling.

Among a variety of lithium power batteries, only the positive electrode material of the lithium iron phosphate power battery does not contain precious metals but is mainly composed of aluminum, lithium, iron, phosphorus, and carbon. As such, enterprises are not enthusiastic about the recycling utilization of lithium iron phosphate, and there are relatively few studies on the recycling of lithium iron phosphate power batteries.

Currently, the methods for recycling the positive electrode material of lithium iron phosphate are mainly high-temperature regeneration and wet recycling. The high-temperature regeneration process has high energy consumption and has strict requirements for the pre-treatment of waste materials. Strict impurity removal is required to avoid residual impurities. Compared with the first synthesized positive electrode material of lithium iron phosphate battery, the re-generated lithium iron phosphate shows a significant decrease in the capacitance and charge-discharge performance.

The wet recycling technology is relatively mature, has relatively low requirements on the pre-treatment of waste batteries, can achieve a high metal recovery rate, thereby obtaining a high-purity precursor material. The current wet recycling method mainly uses crude iron phosphate and lithium-containing leaching liquid as products to be recycled, comprising an acid solution to prepare soluble salt solution and adding alkali to prepare iron phosphate salt and a lithium solution. In the preparation of iron phosphate salt, the pH is usually adjusted by adding sodium hydroxide. On the one hand, a large amount of cationic impurities of Na ions are introduced, causing a decrease of the purity of the subsequent lithium carbonate; on the other hand, since the phosphate salt is difficult to wash due to the high viscosity, both the acid dissolution process and the alkali-addition process will introduce a large amount of impurities of metal cations, which further increases the difficulty of phosphate washing. In order to lower the impurity content, the preparation of higher-purity iron phosphate salt will inevitably consume a large amount of water, thus forming a large amount of chemical wastewater difficult to be treated.

Therefore, a new method of preparing lithium iron phosphate by recycling and utilizating waste batteries is needed to solve the above problems.

SUMMARY

The present invention intends to at least solve one of the technical problems existing in the current technology. For this purpose, the present invention proposes a method of preparing lithium iron phosphate by recycling and utilizing waste batteries. The method re-synthesizes the prepared positive electrode material of lithium iron phosphate by spray pyrolysis after processing the positive electrode material of the waste lithium iron phosphate power batteries. The capacitance and charge-discharge performance of the positive electrode material of lithium iron phosphate prepared by the method is almost the same as those of the first synthesized positive electrode material of lithium iron phosphate.

According to one aspect of the present invention, a method of preparing lithium iron phosphate by recycling and utilizing waste batteries is disclosed, comprising the steps of:

pre-processing a waste lithium iron phosphate battery to obtain lithium iron phosphate powder, adding alkaline liquid to the lithium iron phosphate powder, and filtering to obtain a filter residue;

adding an iron source, a lithium source, or a phosphorus source to the filter residue, and performing ball milling to obtain a ball-milled product;

preparing a carbon source solution, and adding a surfactant to the carbon source solution to obtain a mixed solution;

mixing the ball-milled product and the mixed solution, performing spray pyrolysis to obtain a high-temperature powder, spraying atomized water to the high-temperature powder to remove impurities, and then calcined to obtain a finished product of lithium iron phosphate.

In some embodiments of the present invention, The pre-processing process is as follows: successively discharging, disassembling, and screening the waste lithium iron phosphate battery to obtain a positive electrode sheet, crushing positive electrode sheet, and vibration screening the crushed the positive electrode sheet, undersized compost being the lithium iron phosphate powder.

In some embodiments of the present invention, the iron source is one or more of the iron(II) oxalate, ferrous oxalate, ferric oxide, ferric phosphate, ferric chloride, ferrous chloride, or ferric nitrate.

In some embodiments of the present invention, the lithium source is one or more of lithium carbonate, lithium hydroxide, or lithium dihydrogen phosphate.

In some embodiments of the present invention, the phosphorus source is one or more of ammonium hydrogen phosphate, phosphoric acid, ammonium dihydrogen phosphate, or the iron phosphate.

In some embodiments of the present invention, a molar ratio of lithium, iron, phosphorus in the ball-milled product is (1-1.05):(0.95-1):1.

In some embodiments of the present invention, the carbon source is one or more of sucrose, starch, or glucose.

In some embodiments of the present invention, a mass ratio of the carbon source solution to the ball-milled product is (1-8):1.

In some embodiments of the present invention, the surfactant is one or more of stearate, alkyl glucoside, fatty acid glyceride, or polysorbate.

In some embodiments of the present invention, the surfactant is 0.1-3.0% of the total mass of the mixed solution.

In some embodiments of the present invention, the pressure of the spray pyrolysis is 0.3-0.8 MPa and the temperature is 500-750° C.

In some embodiments of the present invention, the temperature of the calcining is 500-700° C. with a heating rate of 1-5° C./min and the duration of the calcining is 2-10 h.

According to one preferred embodiment of the present invention, it at least has the following beneficial effects:

1. The present invention firstly pre-treats the waste lithium iron phosphate power battery to obtain a pure lithium iron phosphate waste and then supplements the ratio of various elements to prepare a lithium iron phosphate product by means of spray pyrolysis. Lithium iron phosphate droplets sprayed by spray pyrolysis have high sphericity and even particle size distribution. After the high-temperature reaction, spherical-like lithium iron phosphate will be obtained. The spheroidization of lithium iron phosphate is conducive to increase the specific surface area of the material and increase the volume specific energy of the material.

2. During the spraying reaction in the present invention, the spherical spraying droplet contains lithium iron phosphate solids, thereby avoiding the presence of hollow particles; through the addition of surfactants, the viscosity and surface tension of the spraying liquid can be further adjusted, which is conducive to the spray pyrolysis reaction and avoids the particles sticking together.

3. When removing impurities, the present invention uses the waste heat of the high-temperature lithium iron phosphate produced by spraying to remove impurities by atomizing and pure water spraying, so that the atomized pure water evaporates instantaneously, thereby taking away impurities such as hydrogen chloride in the lithium iron phosphate particles.

4. The whole process of the present invention reuses the waste lithium iron phosphate power battery, turns wastes into treasures, protects the environment, reduces the cost, has easy operations, and can be widely applied in the production of lithium iron phosphate.

BRIEF DESCRIPTION OF DRAWINGS

The present invention is further explained in combination with the drawings and embodiments. In which:

FIG. 1 is a comparison diagram of the specific capacity and recycling performance between the first synthesized lithium iron phosphate product and the finished product of lithium iron phosphate prepared by Embodiment 1.

DETAILED DESCRIPTION

The concept of the present invention and the technical effects produced thereof will be described below clearly and completely in combination with the embodiments, so as to fully understand the purpose, features, and effects of the present invention. Obviously, the described embodiments are only a part of the embodiments of the present invention and not all the embodiments. Based on the embodiments of the present invention, other embodiments obtained by those skilled in the art without involving any inventive effort all belong to the protection scope of the present invention.

Embodiment 1

A method of preparing lithium iron phosphate by recycling and utilizing waste batteries, comprising the steps of:
- S1: successively discharging, disassembling, and screening the waste lithium iron phosphate battery to obtain a positive electrode sheet, crushing the positive electrode sheet and vibration screening the crushed positive electrode sheet, removing aluminum foil on the upper layer to obtain lithium iron phosphate powder, adding alkaline liquid to the lithium iron phosphate powder, removing residual aluminum, filtering to obtain a filter residue;
- S2: adding an iron source, a lithium source, or a phosphorus source to the filter residue in S1, adjusting a molar ratio of lithium, iron, phosphorus to be 1.05:1:1, then performing high-energy ball milling to obtain a ball-milled product;
- S3: preparing a sucrose solution, and adding alkyl glucoside to the sucrose solution to obtain a mixed solution, the alkyl glucoside being 2.0% of a total mass of the mixed solution;
- S4: adding the mixed solution and the ball-milled product to a spray pyrolysis device at a mass ratio of 4:1 for spray pyrolysis, setting a spray pressure of the spray pyrolysis device to be 0.81V1 Pa and temperature to be 750° C. to obtain the high-temperature powder, eluting gas produced by spray pyrolysis to obtain an acid solution, spraying atomized water to the high-temperature powder by a water mist spray device to remove impurities, mixing the high-temperature lithium iron phosphate with atomized pure water, rapid vaporization of pure water removes impurities in the lithium iron phosphate particle, finally rising the temperature to 500° C. at a speed of 1° C./min, and remaining the temperature for 2 h to obtain a finished product of lithium iron phosphate.

Embodiment 2

A method of preparing lithium iron phosphate by recycling and utilizing waste batteries, comprising:
- S1: successively discharging, disassembling and screening the waste lithium iron phosphate battery to obtain a positive electrode sheet, crushing the positive electrode sheet and vibration screening the crushed positive electrode sheet, removing aluminum foil on the upper layer to obtain lithium iron phosphate powder, adding alkaline liquid to the lithium iron phosphate powder, removing residual aluminum, filtering to obtain a filter residue;
- S2: adding an iron source, a lithium source or a phosphorus source to the filter residue in S1, adjusting a molar ratio of lithium, iron, phosphorus to be 1.05:0.95:1, then performing high-energy ball milling to obtain a ball-milled product;
- S3: preparing a starch solution, and adding fatty acid glyceride to the starch solution to obtain a mixed solution, the fatty acid glyceride being 3.0% of a total mass of the mixed solution;
- S4: adding the mixed solution and the ball-milled product to a spray pyrolysis device at a mass ratio of 6:1 for spray pyrolysis, setting a spray pressure of the spray pyrolysis device to be 0.8 MPa and temperature to be 500° C. to obtain high-temperature powder, eluting gas produced by spray pyrolysis to obtain an acid solution, spraying atomized water to the high-temperature powder by a water mist spray device to remove impurities, mixing the high-temperature lithium iron phosphate with atomized pure water, rapid vaporization of pure water removes impurities in the lithium iron phosphate particle, finally rising the temperature to 700° C. at a speed of 5° C./min, and remaining the temperature for 10 h to obtain a finished product of lithium iron phosphate.

Embodiment 3

A method of preparing lithium iron phosphate by recycling and utilizing waste batteries, comprising the steps of:
S1: successively discharging, disassembling and screening the waste lithium iron phosphate battery to obtain a positive electrode sheet, crushing the positive electrode sheet and vibration screening the crushed positive electrode sheet, removing aluminum foil on the upper layer to obtain lithium iron phosphate powder, adding alkaline liquid to the lithium iron phosphate powder, removing residual aluminum, filtering to obtain a filter residue;
S2: adding an iron source, a lithium source or a phosphorus source to the filter residue in S1, adjusting a molar ratio of lithium, iron, phosphorus to be 1:0.95:1, then performing high-energy ball milling to obtain a ball-milled product;
S3: preparing a glucose solution, and adding polysorbate to the glucose solution to obtain a mixed solution, the polysorbate being 0.5% of a total mass of the mixed solution;
S4: adding the mixed solution and the ball-milled product to a spray pyrolysis device at a mass ratio of 2:1 for spray pyrolysis, setting a spray pressure of the spray pyrolysis device to be 0.81 MPa and temperature to be 600° C. to obtain high-temperature powder, eluting gas produced by spray pyrolysis to obtain an acid solution, spraying atomized water to the high-temperature powder by a water mist spray device to remove impurities, mixing the high-temperature lithium iron phosphate with atomized pure water, rapid vaporization of pure water removes impurities in the lithium iron phosphate particle, finally rising the temperature to 600° C. at a speed of 3° C./min, and remaining the temperature for 6 h to obtain a finished product of lithium iron phosphate.

FIG. 1 is a comparison diagram of the specific capacity and recycling performance between the first synthesized (not used) conventional lithium iron phosphate product and the finished product of lithium iron phosphate prepared by Embodiment 1. As can be seen from the FIGURE, their specific capacity and recycling performance are almost the same.

The present invention is described in detail above in combination the Drawings. However, the present invention is not limited to the above embodiments. Within the knowledge scope of those skilled in the art, various modifications can be made without departing from the scope of the present invention. In addition, in the case of no conflict, the embodiments of the present invention and features in the embodiments can be combined with each other.

The invention claimed is:

1. A method of preparing lithium iron phosphate by recycling and utilizing waste batteries, comprising:
pre-processing a waste lithium iron phosphate battery to obtain lithium iron phosphate powder, adding alkaline liquid to the lithium iron phosphate powder, and filtering the lithium iron phosphate powder after adding the alkaline liquid to obtain a filter residue;
adding an iron source, a lithium source or a phosphorus source to the filter residue, and performing ball milling on the filter residue obtained by adding the iron source, the lithium source or the phosphorous source to obtain a ball-milled product;
preparing a carbon source solution, and adding a surfactant to the carbon source solution to obtain a mixed solution;
mixing the ball-milled product and the mixed solution, performing spray pyrolysis on a mixture obtained by mixing the ball-milled product and the mixed solution to obtain a high-temperature powder, spraying atomized water to the high-temperature powder to remove impurities, and then calcining the high-temperature powder after impurity removal to obtain a finished product of lithium iron phosphate;
wherein a pressure of the spray pyrolysis is 0.3-0.8 MPa and a temperature of the spray pyrolysis is 500-750° C., and wherein a temperature of the calcining is 500-700° C. with a heating rate of 1-5° C./min and a duration of the calcining is 2-10 h.

2. The method of claim 1, wherein pre-processing comprising: successively discharging, disassembling and screening the waste lithium iron phosphate battery to obtain a positive electrode sheet; crushing the positive electrode sheet; and performing vibration screening on the positive electrode, sheet after being subjected to crushing to obtain undersized compost which is lithium iron phosphate powder.

3. The method of claim 1, wherein the iron source is one or more of iron(II) oxalate, ferrous oxalate, ferric oxide, ferric phosphate, ferric chloride, ferrous chloride or ferric nitrate.

4. The method of claim 1, wherein a molar ratio of lithium, iron, phosphorus in the ball-milled product is (1-1.05):(0.95-1):1.

5. The method of claim 1, wherein the carbon source is one or more of sucrose, starch, or glucose.

6. The method of claim 1, wherein a mass ratio of the carbon source solution to the ball-milled product is (1-8):1.

7. The method of claim 1, wherein the surfactant is one or more of stearate, alkyl glucoside, fatty acid glyceride, or polysorbate.

8. The method of claim 1, wherein the surfactant is 0.1%-3.0% of a total mass of the mixed solution.

* * * * *